United States Patent [19]

Shoup

[11] 4,353,597
[45] Oct. 12, 1982

[54] READILY REMOVABLE AND REPLACEABLE WEAR PADS FOR SLIDING BED VEHICLES

[75] Inventor: Gary L. Shoup, Greencastle, Pa.

[73] Assignee: Jerr-Dan Corporation, Greencastle, Pa.

[21] Appl. No.: 158,620

[22] Filed: Jun. 11, 1980

[51] Int. Cl.³ .................................................. B60P 1/34
[52] U.S. Cl. ...................................... 298/12; 308/6 R
[58] Field of Search ................ 308/6 R, 238; 298/12; 238/310, 331, 338, 340, 382

[56] References Cited

U.S. PATENT DOCUMENTS 1,959,855  5/1934  Chamness et al. ............... 238/338 X
4,216,904  8/1980  Vivion ............................ 238/310 X Primary Examiner—Duane A. Reger
Attorney, Agent, or Firm—Brady, O'Boyle & Gates

[57] ABSTRACT

To eliminate completely the necessity for removing a sliding truck bed in order to shim or replace the dry lube wear pads for such bed, a wear pad containment is provided including readily removable wear pad retainers secured by bolts which also serve to retain lower wear pads whose servicing or replacement is also facilitated. The readily replaceable wear pads are not pierced by any fastener and therefore have a longer useful life.

12 Claims, 7 Drawing Figures

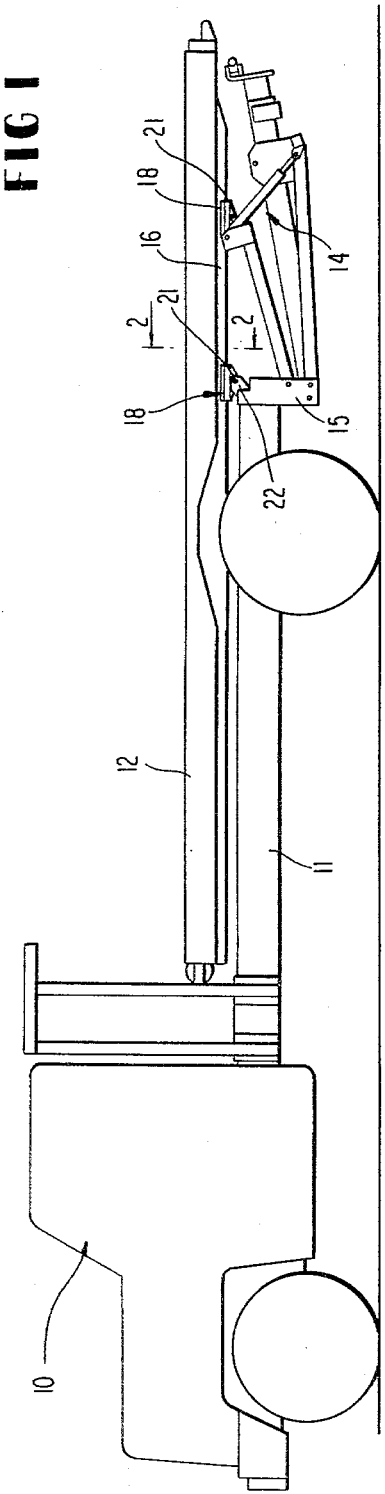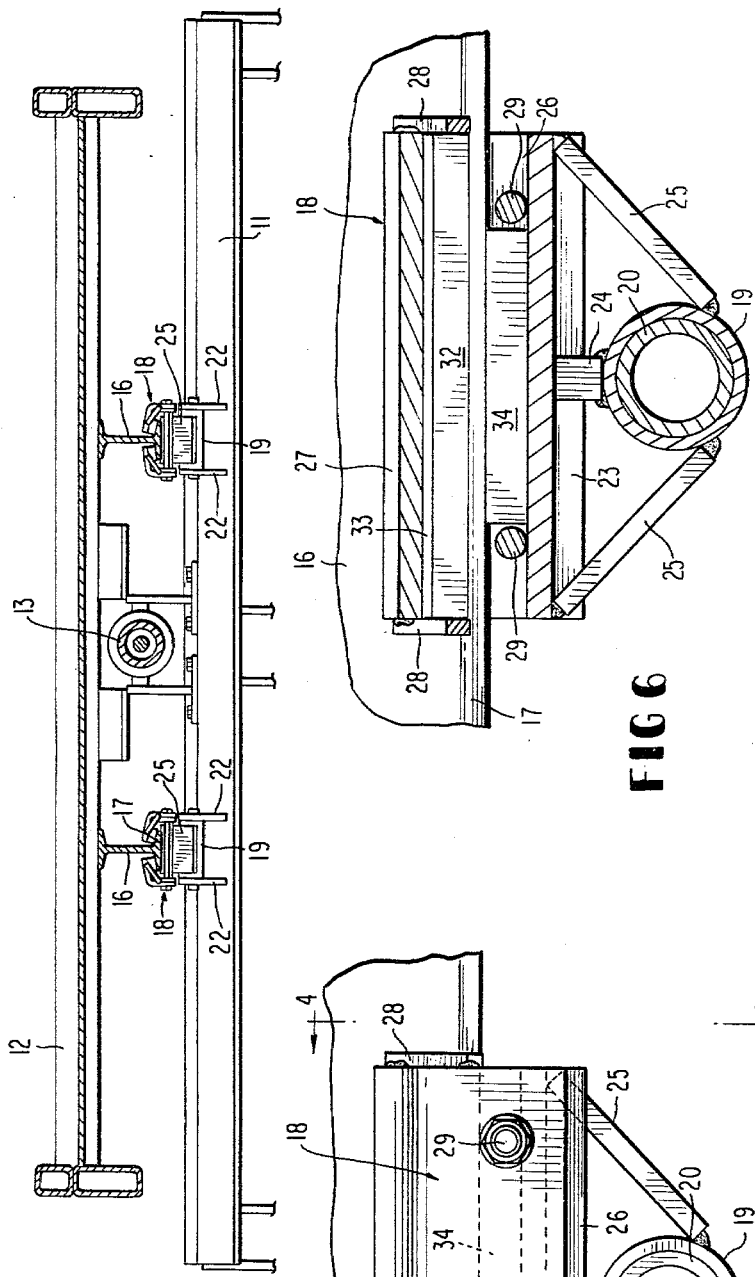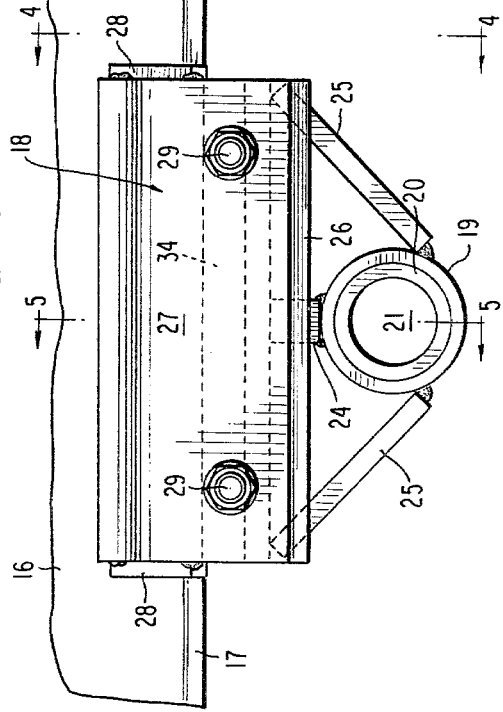

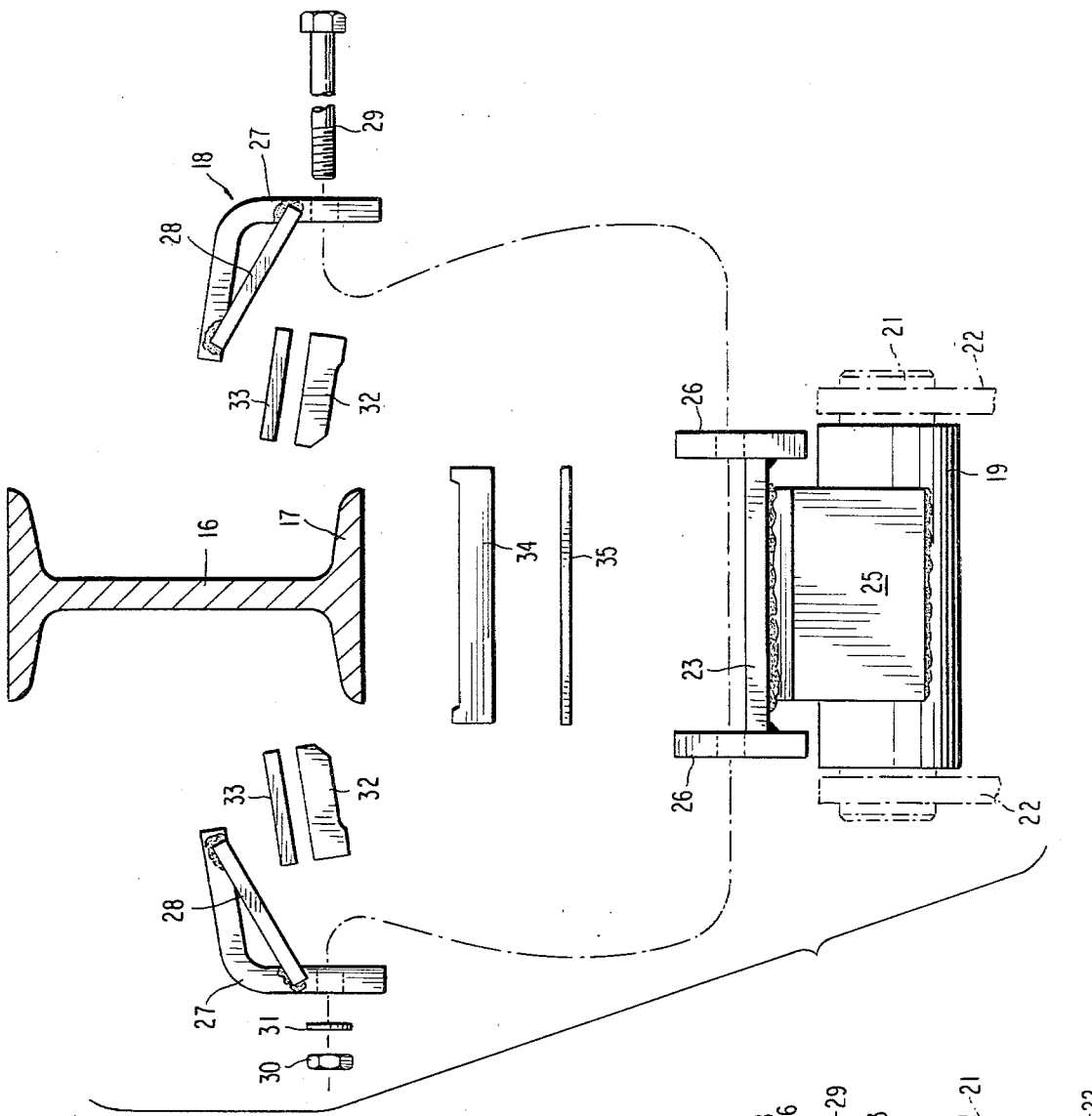
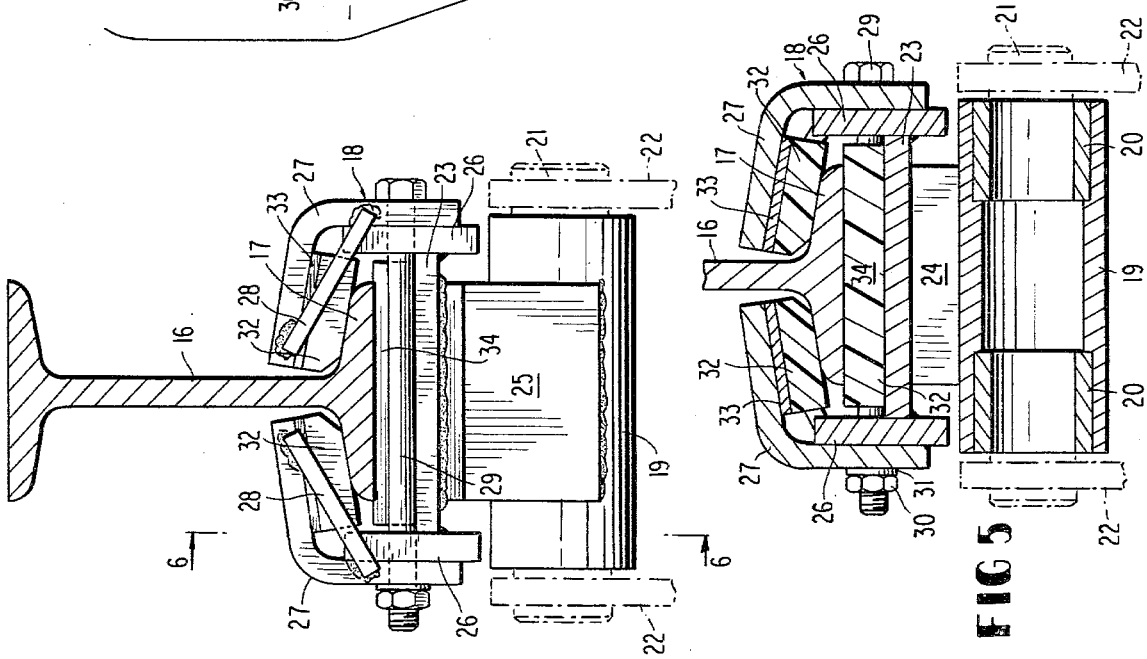

1

READILY REMOVABLE AND REPLACEABLE WEAR PADS FOR SLIDING BED VEHICLES

CROSS-REFERENCE TO RELATED APPLICATION

This application contains subject matter in common with prior copending application Ser. No. 17,199, filed Mar. 5, 1979, for VEHICLE TRANSPORTER now U.S. Pat. No. 4,239,275.

BACKGROUND OF THE INVENTION

The present invention arises as a result of a need for an improved slide bearing or wear pad arrangement for the tilting and sliding bed of a vehicle of the type disclosed in U.S. Pat. No. 3,430,792 and in the above-referenced copending application.

In the prior art, metal-to-metal slide bearings have been utilized in the above-stated environment but tend to wear rapidly or seize unless well lubricated. Consequently, frequent replacement of the metal wear pads is necessitated by grinding off the remainder of the worn pad and welding on a new one. This is quite costly and time-consuming.

The use of rollers as bearing means for the sliding vehicle bed has also been proposed, but due to high stress concentration as a result of line contact between the roller and straight moving beam peening and bending of the beam flange tends to occur and the arrangement is not satisfactory.

Another prior art expedient shown in the referenced copending application involves the use of phenolic dry lube wear pads which are superior to the other prior art means in terms of load distribution and minimized friction. However, as disclosed in the prior application, the servicing and removal of the phenolic wear pads requires the removal of fastener elements which pierce the wear pads and still requires the removal of the truck sliding bed, as do all of the above prior art arrangements. This results in valuable down time for the truck and is generally inconvenient, time-consuming and unduly costly. Also, the fasteners which pierce the prior art phenolic wear pads substantially reduce their useful life because of the removal of material from them to accommodate the fasteners and a reduction in their effective thickness.

It is the object of this invention to eliminate completely the drawbacks of the prior art by providing a simplified and efficient phenolic wear pad containment which does not necessitate piercing the wear pads with fasteners and merely allows the pads to be held captive between the flanges of the sliding vehicle bed and relatively stationary but readily removable retainer elements which prevent displacement of the wear pads as the sliding bed moves relative to them. When shimming or replacing worn wear pads, there is no need to remove the vehicle sliding bed and it is only necessary to remove a pair of bolts from each wear pad containment and then remove a pair of upper wear pad retainers in order to free both the upper and lower phenolic wear pads from the containment. The sliding bed can be relieved of weight during the wear pad servicing operation by using the vehicle hydraulic system or external jacking means.

BRIEF DESCRIPTION OF THE DRAWINGS

FIG. 1 is a side elevation of a tilting and sliding bed truck equipped with wear pad containments in accordance with the invention.

FIG. 2 is an enlarged transverse vertical section taken on line 2—2 of FIG. 1.

FIG. 3 is an enlarged fragmentary side elevation showing one unit of the wear pad containment and associated elements.

FIG. 4 is a fragmentary vertical section taken on line 4—4 of FIG. 3.

FIG. 5 is a similar section taken on line 5—5 of FIG. 3.

FIG. 6 is a fragmentary vertical section taken on line 6—6 of FIG. 4.

FIG. 7 is an exploded view, similar to FIG. 4, with the sliding bed rail in cross section.

DETAILED DESCRIPTION

Referring to the drawings in detail wherein like numerals designate like parts, and referring first to FIG. 1 to establish the environment of the invention, a tilting and sliding bed truck 10 generally of the type disclosed in U.S. Pat. No. 3,430,792 and in the above-referenced application is shown. This truck includes a main chassis frame 11 above which is mounted a sliding and tilting bed 12. The bed 12 is moved longitudinally forwardly and rearwardly by a centrally located longitudinal power cylinder 13 disposed between the main chassis frame 11 and the sliding bed 12. A jacking and lift assembly 14 is connected between the bed 12 and depending bracket plates 15 on the rear end of main chassis frame 11.

The sliding and tilting bed 12 includes a pair of lower parallel longitudinal I-beam rails 16 whose lower flanges 17 are slidably held in bearing or wear pad containments 18, the construction of which forms the main subject matter of this invention. As shown in FIG. 1, there are two units 18 associated with the sliding and tilting truck bed 12 on each side thereof, that is, one pair of units for each I-beam rail 16 of the truck bed. The rearmost units 18 are coupled with the jacking assembly 14 and the forwardmost units 18 are secured to the rear of main chassis frame 11.

Each wear pad containment unit 18 includes a lower transverse axis bearing sleeve 19 containing bushings 20 which receive therethrough a pivot pin 21 held in arms 22 rising from the main chassis frame 11 in the case of the two forwardmost units 18. The two rearward units 18 have their corresponding pivot elements 21 supported through arms or brackets carried by the jacking and lift assembly 14.

Each wear pad containment unit 18 further comprises a frame including a horizontal plate 23 resting on a rectangular bar member 24 which is securely welded to the top of sleeve 19, as best shown in FIGS. 3 and 6. Side inclined brace plates 25 are similarly welded between the bottom of horizontal plate 23 and opposite side of sleeve 19 to form a rigid support structure. This support structure or frame further includes spaced vertical side plates 26 welded to the horizontal plate 23 and projecting above it. The lower edges of the side plates 26 are spaced slightly above the top of sleeve 19, as shown. Thus, the support frame composed of welded plates 23 and 26 is bodily and rigidly mounted on the sleeve 19 and can turn with the sleeve around the axis of pivot pin 21.

Each containment unit 18 additionally comprises readily separable generally L-shaped wear pad clamps or retainers 27 having diagonal wear pad retainer bars 28 welded across their fore and aft ends. These retainers 27 are held in place on the unit 18 by a pair of spaced parallel transverse bolts 29 located immediately below the flanges 17 of sliding I-beam rails 16 and above horizontal plate 23. At their far ends, the bolts 29 carry nuts and washers 30 and 31.

Upper phenolic wear pads 32 and optional shims 33 are held between the top face of sliding rail flange 17 and the opposing somewhat inclined face of wear pad retainer 27. The retainer bars 28 prevent displacement of the upper wear pads and shims longitudinally and they are held captive against transverse movement by the I-beam rail 16 and the holding action of retainers 27.

A single lower phenolic wear pad 34 and optional shim 35 are placed between the bottom face of sliding rail flange 17 and the horizontal support plate 23. The vertical side plates 26 prevent any appreciable displacement of the lower wear pads 34 transversely of the axis of rail 16, and the two bolts 29 closely straddle the fore and aft ends of the lower wear pads, FIG. 6, and prevent displacement thereof longitudinally. Thus, it may be seen that the two bolts 29 serve a dual purpose in the invention of detachably securing retainers 27 in the wear pad units 18 and retaining or holding the lower wear pads 34 against displacement.

A chief feature of the invention in contrast to the prior art is that neither the upper or lower wear pads 32 or 34 are pierced by any fastener and the full thicknesses of the pads are available for bearing purposes during gradual wear on the pads thus rendering them useful over a much longer time before shimming or complete replacement becomes necessary. FIG. 7 of the drawings shows the wear pads 32 and 34 somewhat recessed due to wear, as they might be at the time requiring shimming or replacement. The other drawing figures show the upper and lower wear pads without substantial wear.

The invention, as described, fulfills its primary objective by rendering servicing or replacement of all of the wear pads simple and economical without the necessity for complete removal of the sliding truck bed 12 from the units or suppots 18, as was heretofore necessary in all of the known prior art arrangements. Instead, by means of the invention, it is only necessary to remove the two bolts 29 of each unit 18 which releases the retainers 27 and allows ready removal of both the upper and lower wear pads 32 and 34 along with their shims, as required. During this operation, the rails 16 are relieved of their weight or loading either by blocking the underside of the bed 12 near its forward end and utilizing the hydraulic jacking assembly 14 of the truck, or an external jacking means if preferred. The installation of new upper and lower phenolic wear pads and the reassembly of the retainers 27 and their bolts 29 is a very simple matter and the necessity for long periods of down time for the truck is avoided.

It should be clear, in light of the foregooing description, that the sleeves 19 on which the plate elements 23 and 26 are mounted enable the containment units 18 to pivot around the axes of pins 21, as required for tilting of the truck bed 12.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed. For instance, the wear pad assemblies or containments may be used in other environments and in an arrangement reverse from that illustrated in the drawings where the longitudinal I-beam rails 16 are stationary and the wear pad containments 18 depend from a slidable frame member, similar to frame member 11, and engage the top flanges of the I-beam rails, as would be illustrated, for example, by turning FIGS. 2-7 upside-down. Also, in some installations, the support frame composed of plates 23 and 26 may be directly connected to its corresponding frame member 11 rather than being connected thereto through a pivot connection.

I claim:

1. A wear pad arrangement particularly for sliding and tilting bed vehicles comprising a pivot bearing means adapted for engagement with a supporting pivot element on a sliding and tilting bed vehicle or the like, a wear pad containment frame fixed to the pivot bearing means for pivotal movement therewith, opposing side upper wear pad retainers on said frame, spaced releasable fasteners for said retainers engaging the retainers and frame and extending across the frame, a lower wear pad on the frame between said spaced fasteners and held against displacement in one direction by the fasteners and in a second direction by the frame, the lower wear pad being adapted to slidably support a rail carried by the bed of a sliding and tilting bed vehicle, and a pair of upper wear pads arranged above the lower wear pad and held within said retainers and restrained by the retainers against displacement in two directions, the upper wear pads adapted to engage upper surfaces of a rail on the bed of a sliding and tilting bed vehicle.

2. A wear pad arrangement as defined in claim 1, and said lower wear pad and upper wear pads comprising phenolic dry lube wear pads.

3. A wear pad arrangement as defined in claim 1, and said containment frame comprising a base plate for the support of the lower wear pad and a pair of spaced upstanding side plates having apertures to receive said fasteners, and said side plates holding the lower wear pad against substantial displacement in a direction parallel to the axes of said fasteners.

4. A wear pad arrangement as defined in claim 3, and said upper wear pad retainers comprising approximately L-shaped plate retainers including portions lying in contact with said side plates and portions extending inwardly of the side plates and overlying said base plate and said lower wear pad in spaced relationship.

5. A wear pad arrangement as defined in claim 4, and said fasteners comprising bolts extending through the first-named portions of said retainers and through said side plates and disposed immediately above said base plate.

6. A wear pad arrangement as defined in claim 5, and a pair of opposite end diagonal upper wear pad constraining bars on said retainers and lying across opposite ends of the upper wear pads to prevent displacement thereof in a direction across the axis of said bolts.

7. A wear pad arrangement as defined in claim 1, and said lower and upper wear pads comprising solid plate-like dry lube wear pads which are held in assembled relationship on opposite sides of a rail of a sliding and tilting vehicle bed solely by the restraining action of said frame and fasteners and said retainers.

8. A wear pad arrangement as defined in claim 7, and said wear pad arrangement comprising paired unit of the arrangement in spaced relationship relative to two parallel rails of a sliding and tilting bed.

9. In a sliding and tilting bed vehicle including a bed having a longitudinal lower I-beam guide rail, a guide rail wear pad arrangement comprising a wear pad containment frame fixed to the chassis of said vehicle, opposite side upper wear pad retainers detachably coupled with said containment frame, spaced fasteners extending across the frame and detachably coupling said opposite side retainers with the frame, a lower wear pad resting on said frame and held against substantial displacement in opposite directions by the frame and by said spaced fasteners, the lower wear pad underlying and slidably supporting the I-beam guide rail, and a pair of upper wear pads disposed above the lower wear pad and slidably engaging upper flange surfaces of the I-beam guide rail on opposite sides of the center web of the I-beam guide rail and engaged within and held against displacement solely by the action of the retainers.

10. In a sliding and tilting bed vehicle as defined in claim 9, said wear pad retainers comprising approximately L-shaped retainers having top portions which overlie the upper wear pads and sai upper flange surfaces, and the retainers having side portions engaging the opposite sides of said containment frame.

11. A wear pad assembly for use between a first member and a second member having an I-beam type rail wherein one of said first and second members is movable relative to the other, comprising a wear pad containment frame connected to said first member, opposite side retainers on said frame, spaced releasable fasteners for said opposite side retainers engaging said retainers and frame and extending across the frame, a first wear pad in the frame between said spaced fasteners and held against displacement in one direction by the fasteners and in a second direction by the frame, said first wear pad adapted to slidably engage the outer flange surface of the I-beam type rail, and a pair of second wear pads spaced from said first wear pad and adapted to slidably engage the inner flange surfaces of the I-beam type rail opposite the outer flange surface and on opposite sides of the center web of the I-beam type rail, and held within said retainers and restrained against displacement by the action of the retainers.

12. In a sliding and tilting bed vehicle as defined in claim 9, and containing means on opposite ends of the opposite side upper wear pad retainers positioned to prevent end displacement of the pair of upper wear pads.

* * * * *